United States Patent [19]
Kelly, Jr. et al.

[11] Patent Number: 5,335,268
[45] Date of Patent: Aug. 2, 1994

[54] INTELLIGENT ROUTING OF SPECIAL SERVICE TELEPHONE TRAFFIC

[75] Inventors: John F. Kelly, Jr., Wylie, Tex.; Robert G. Laird, Colorado Springs, Colo.; Thomas E. Baker, Monument, Colo.; Cristobal A. Torres, Colorado Springs, Colo.

[73] Assignee: MCI Communications Corporation, Washington, D.C.

[21] Appl. No.: 964,134

[22] Filed: Oct. 22, 1992

[51] Int. Cl.5 .................... H04M 15/00; H04M 7/00
[52] U.S. Cl. .................................. 379/112; 379/113; 379/220; 379/221
[58] Field of Search ............... 379/112, 113, 221, 220

[56] References Cited

U.S. PATENT DOCUMENTS

| | | | |
|---|---|---|---|
| 4,723,270 | 2/1988 | Okamoto et al. | 379/113 |
| 4,737,983 | 4/1988 | Frauenthal et al. | 379/221 |
| 4,953,204 | 8/1990 | Cuschleg, Jr. et al. | |
| 4,974,256 | 11/1990 | Cyr et al. | |
| 4,991,204 | 2/1991 | Yamamoto et al. | 379/221 |
| 5,023,868 | 6/1991 | Davidson et al. | |
| 5,042,064 | 8/1991 | Chung et al. | |
| 5,067,074 | 11/1991 | Farel et al. | |
| 5,068,892 | 11/1992 | Livanos | |

Primary Examiner—Stephen Chin
Assistant Examiner—Kevin Kim
Attorney, Agent, or Firm—Ormand E. Austin

[57] ABSTRACT

A method and apparatus for dynamically balancing special service telephone calling traffic among a plurality of automatic call distributors and servicing agents as a function of supply and demand for such services. Data is gathered from originating and terminating switches of the telephone network, from each automatic call distributor, and from a call routing data base. The collected data is analyzed to characterize the supply and demand. A routing plan through the network is formulated so that the number of calls to each automatic call distributor is alloted as a function thereof and of the relative costs in routing to one point or another. The formulated plan is implemented for control by effecting changes in the routing data base. In the routing plan formulation, cognizance may also be taken of manpower availability for agent staffing.

17 Claims, 5 Drawing Sheets

INTELLIGENT ROUTING OF SPECIAL SERVICE TELEPHONE TRAFFIC

This invention relates to methods and apparatus for controlling the routing of special service telephone traffic, such as 800 inbound telephone calls, through a telecommunications network for automatic call distribution to telephone service bureaus and similar operations.

BACKGROUND OF THE INVENTION

Special service telephone calling is now widely and creatively used in this country for a variety of services, both commercial and non-commercial. Among other advantages, special service call processing allows subscribers for "800" and "900" inbound services, for example, to promote the same seven digit telephone number nationwide (perhaps especially tailored for unique association with the subscriber) and to thereby avoid numerous local or long distance telephone numbers. Thus, whereas the usual seven digit telephone number is rather rigidly associated with a particular telephone station, special service calls are not and they must be routed for appropriate, responsive service on the basis of some network intelligence.

Typically, the inbound, special service traffic, such as that to be moved in response to a toll free 800 telephone number, is routed through a long distance telephone network to a distributed arrangement of automatic call distributors (ACDs). The ACDs, which are likely to be geographically disbursed, and which may be owned and operated either by the special service customer or by the telephone carrier, further route the traffic to various service bureaus and to agent, or operator, groups within the bureaus. The particular ACD, and the particular agent group associated with an ACD, to which calls are routed may depend on various parameters such as the geographical origin of a call, the time of day and day of the week, the subject matter of a call (usually identified from the dialed number), and other similar factors. Although this allows subscribers to implement tailored route plans, the traffic routing is still rather rigidly predetermined and it is difficult to implement route changes quickly and easily to adapt to changing calling patterns.

With the enormous growth in this kind of telephone traffic it frequently occurs, with predetermined routing, that one or more ACDs may be overloaded with traffic, while others, at the same time, may be underutilized. Callers may experience long holding times prior to receiving a response and a substantial proportion of them may decide to hang up without completion of the call.

The result is that the subscriber (e.g., a customer who offers 800 call-in services) loses calls and is at least partly defeated in his purpose of offering the special call service. At the same time, other service agents, or other resources, capable of handling the same calls at other locations may only be partially occupied. Thus, the resources are not always economically allocated.

In view of these and other problems with prior art systems, it is among the objects of the present invention to provide a more dynamic, near real-time load balancing method and system for special service call traffic.

Still further, the present invention seeks to provide a system and method for routing special service telephone call traffic through a network to achieve more balanced routing as a function of the current demand for call services, the level and distribution of supply of resources available for response to the demand, and the relative costs of implementing various route plans.

SUMMARY OF THE INVENTION

Accordingly, the present invention provides a method and apparatus for dynamically balancing special service telephone calling traffic among a plurality of automatic call distributors (ACDs) and servicing agents as a function of a level of demand for such special service calls and a level of supply available to respond to the demand. By the invention, data is gathered from originating and terminating switches of the telecommunications network which carries the traffic, from each ACD, and from a routing data base which is operative to define the routing of special service calls through the network. The collected data is analyzed to characterize the supply and demand. A routing plan from originating switches to ACDs is formulated so that the number of calls to each ACD is alloted as a function of the level of demand for service, the level of supply of service, and the cost of routing. The formulated plan is implemented for control by effecting changes in the routing information contained in the routing data base.

The invention preferably includes a manpower planning system, or allows for input data representative of manpower planning, so that the supply level in formulating the routing plan is further characterized on the basis of available, or to be available, manpower.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Although the invention is useful for a variety of call routing applications, it can be described very straightforwardly in the context of 800 toll-free special service calling.

Figure 1:
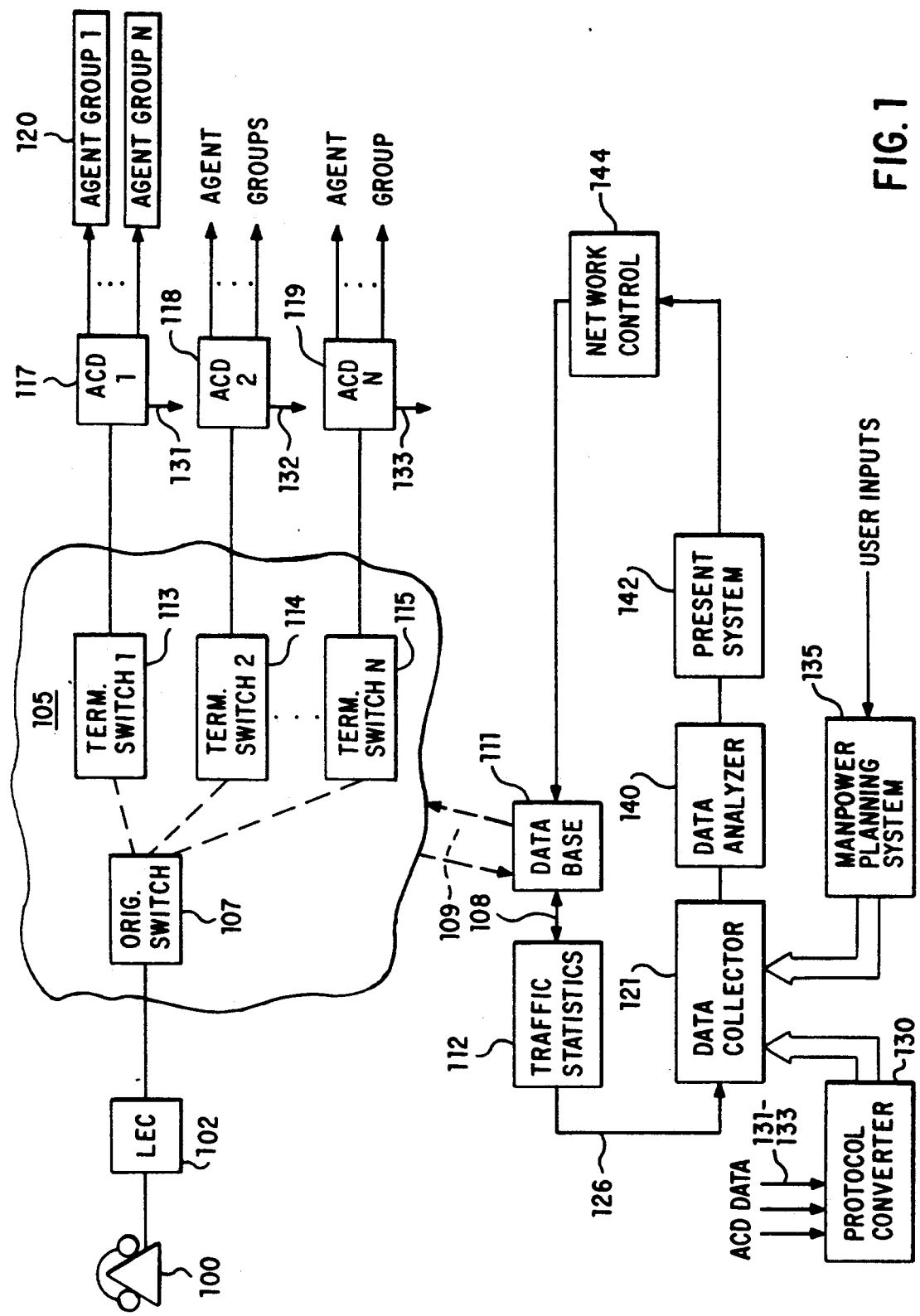
FIG. 1 is a block diagram showing operative components of a system in accordance with the invention.
Figure 2A:
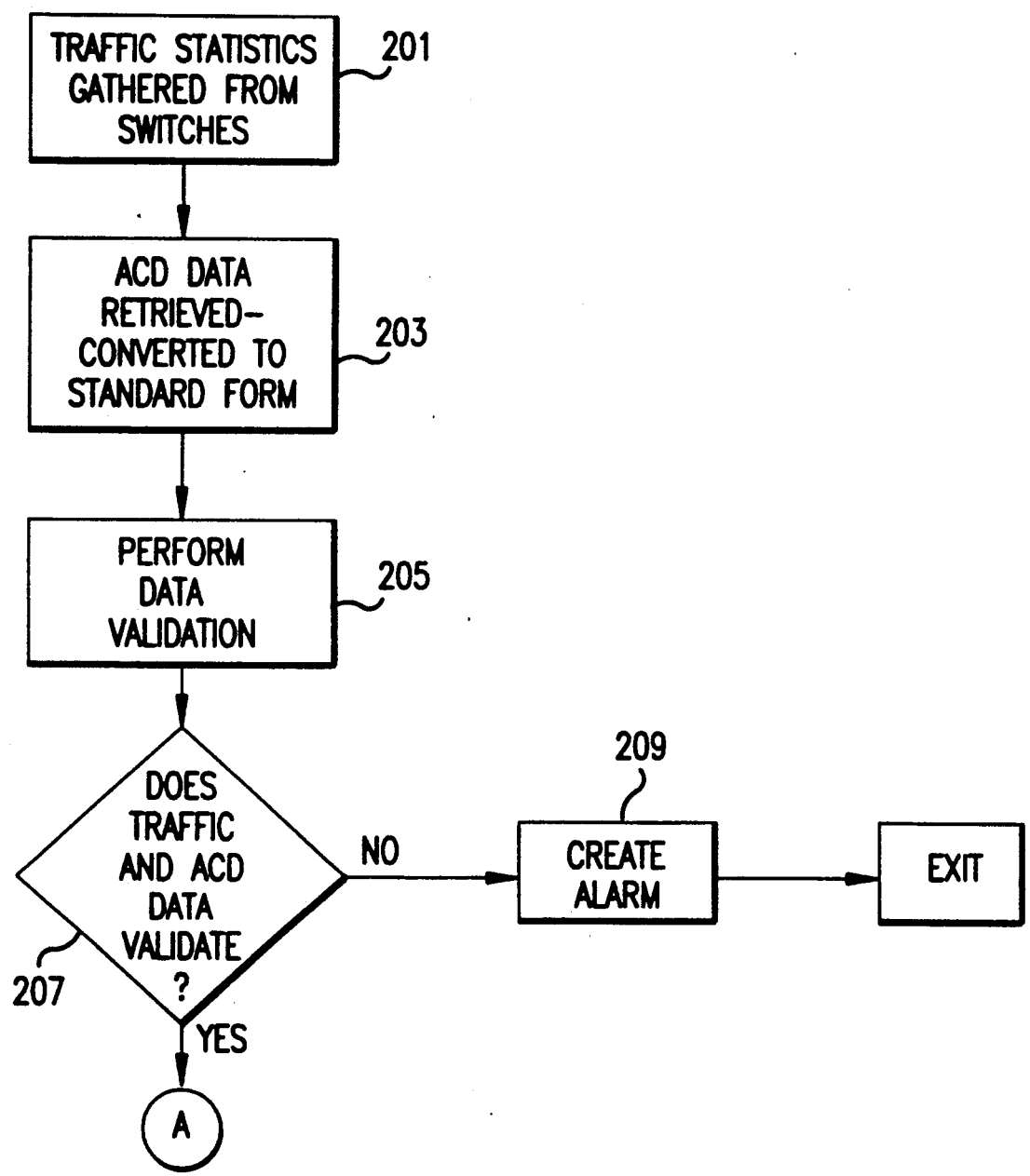
FIGS. 2A–2D present a flow chart of operative steps carried out in one form of the invention.
Figure 2B:
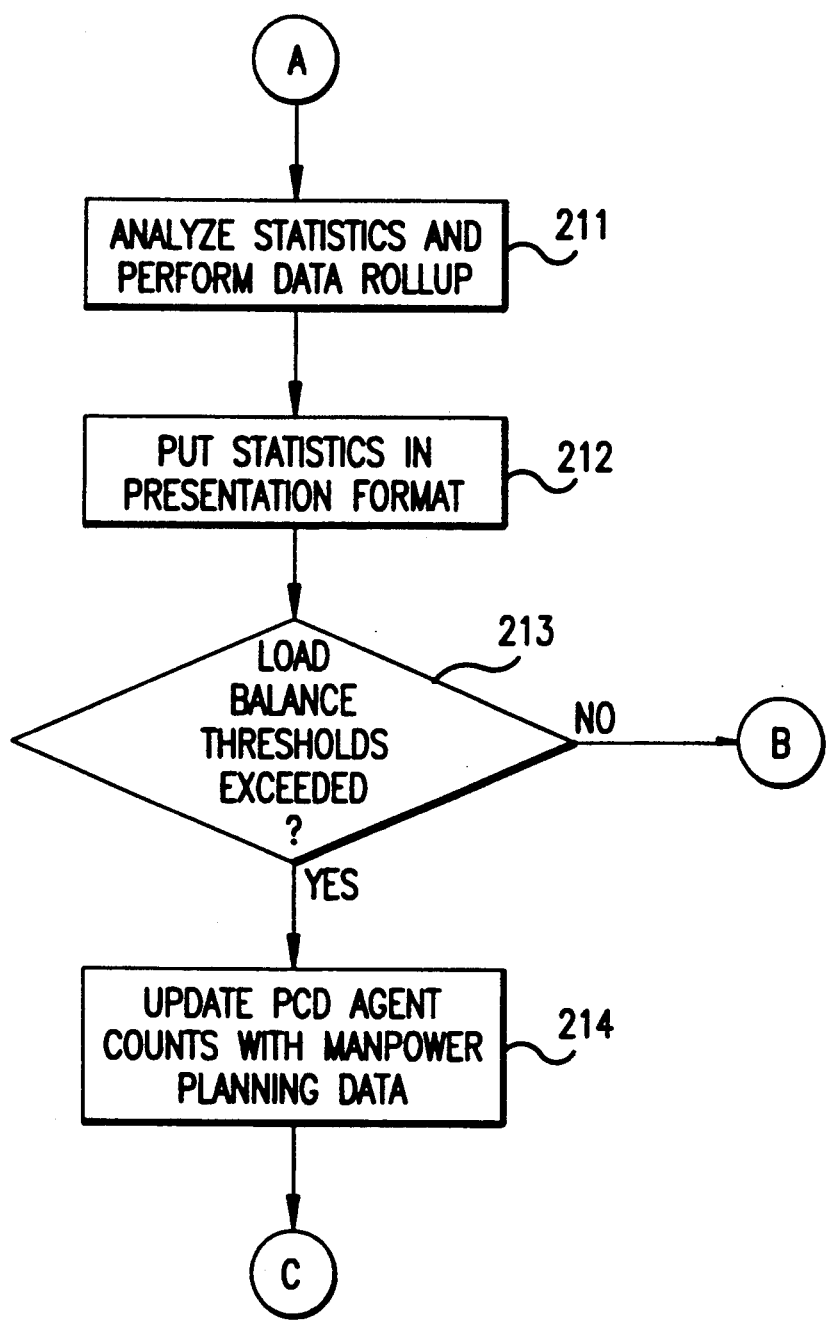
Figure 2C:
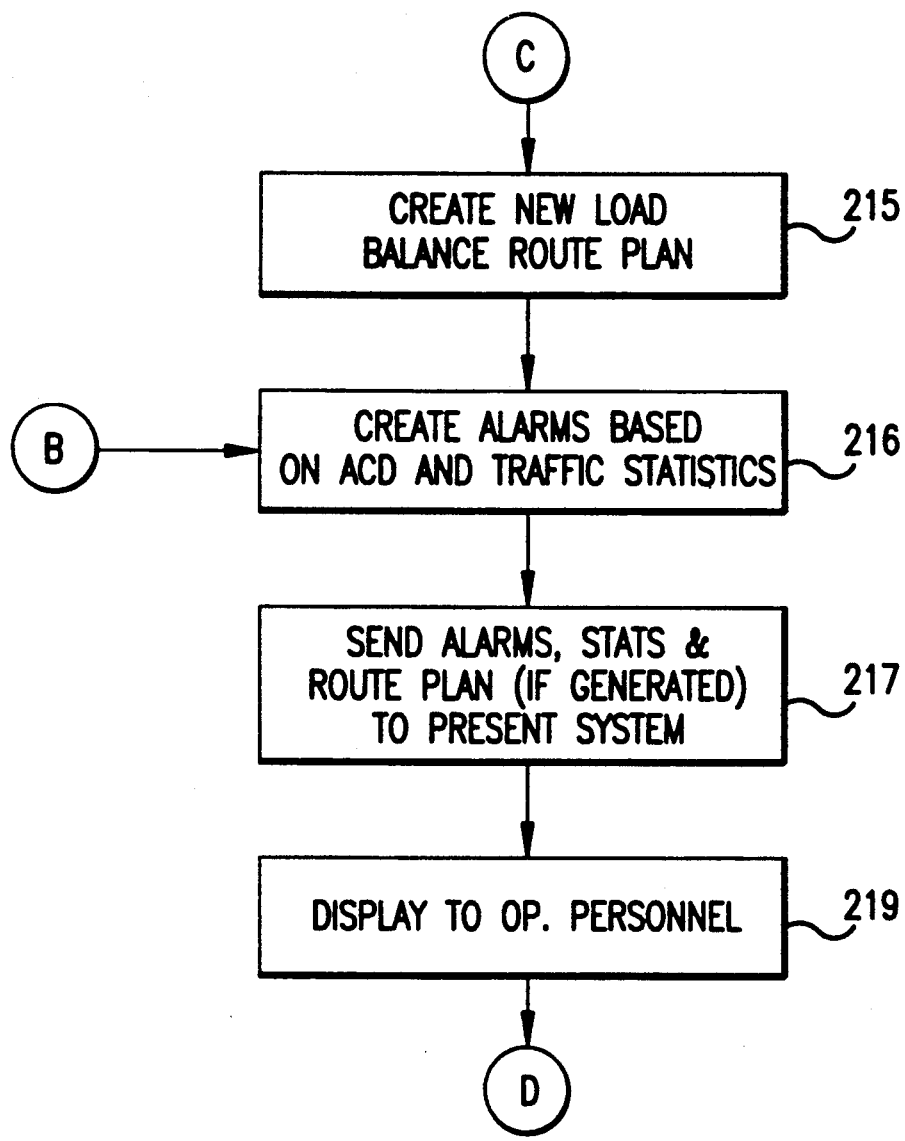
Figure 2D:
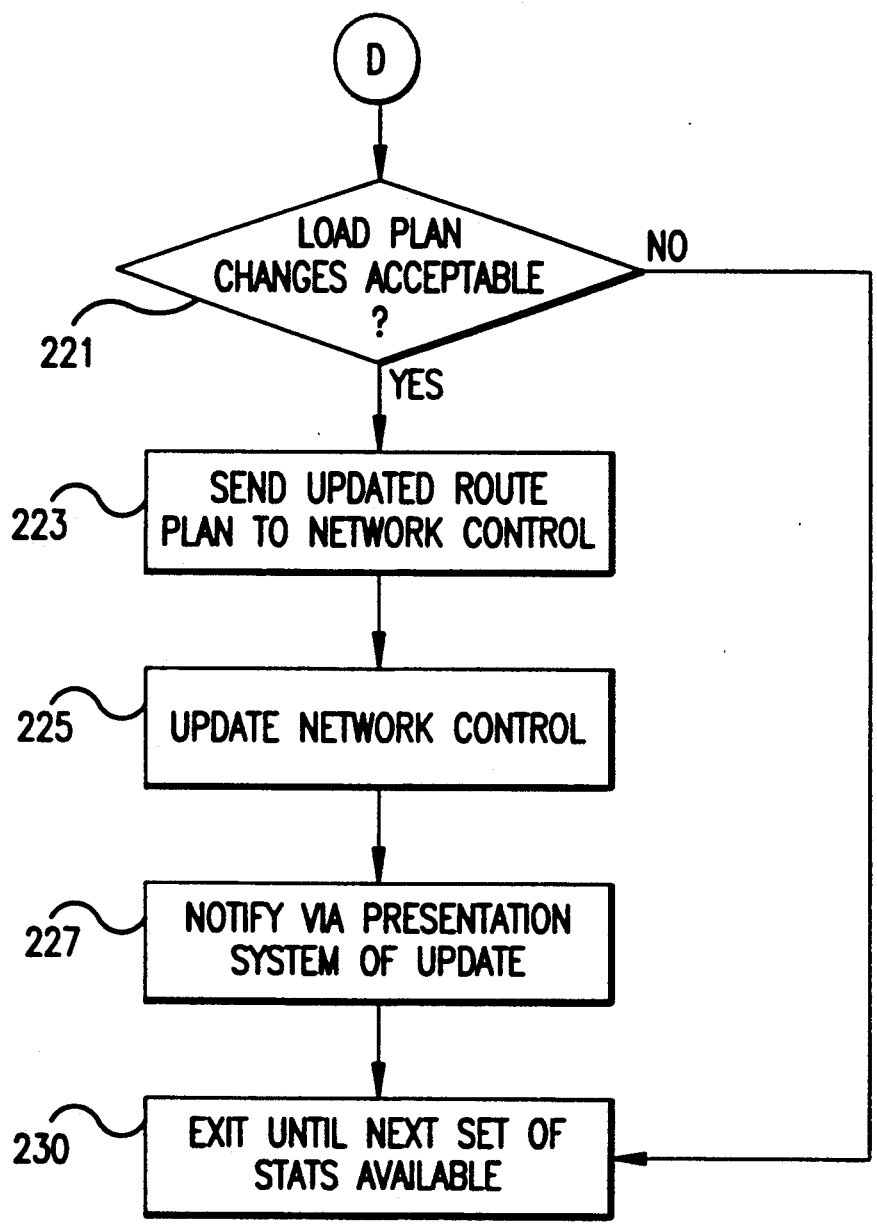

In FIG. 1, for example, a caller at telephone station 100 may desire to place a call to a toll-free number of the type 800-NXX-XXXX, wherein NXX-XXXX might be a subscriber's particular number promoted nationwide to elicit caller responses for some business purpose. The call is initially handled by the local exchange 102, which, from the 800 service access code (SAC), recognizes that the call is to be handed off to an interexchange carrier operating a long-distance network, such as network 105.

Within the network 105, information about the call is received from LEC 102 by an originating switch 107. Typically, the originating switch will receive at least the dialed number and the ANI (automatic number identification) of the calling telephone. Recognizing the call as an 800 number requiring special routing, the originating switch 107, via a signaling network 109, sends at least the pertinent part of the received information (e.g., dialed number and ANI) to a network data base 111 for routing instructions.

The network data base 111 contains information for routing the call through the network 105 to a terminating switch, such as one of switches 113, 114, or 115, and ultimately to an automatic call distributor (ACD) (such as one of the ACDs 117–119) and to a particular, associated agent group (such as one of the agent groups 120) connected to one of the ACDs.

A number of ACDs, such as the grouping illustrated by ACDs 117–119, are usually geographically distributed at several locations around the country. For example, it might be of strategic advantage to locate ACD 117 in New York, ACD 118 in Denver, ACD 119 in San Francisco, and other ACDs at other locations. Among other things, a distribution of ACDs (and agent service groups) facilitates handling calls from different time zones and at different times of the day.

The routing information, produced by the data base 111 as a function of various parameters (including the dialed number and ANI), is returned via the signaling network 109, to the originating switch 107 for call completion. Thus, the data base information, provided in response to routing queries from originating switches, determines the routing for each call. While only one calling station, one local exchange, and one originating switch are illustrated in FIG. 1, it will be understood, of course, that there will, at any time, probably be numerous callers to the same 800 number and that these calls will likely be handled by various local exchanges interconnected to different originating switches of the network 105. In fact it is an object of the invention to simultaneously handle a multitude of calls, from various locations, and to balance the routing of such calls to the ACDs and agent groups.

It will also be recognized that the data base 111 is capable, via the signaling connections 109, of handling all the switch transactions essentially simultaneously so that there is no undue delay. The signaling communications between the data base 111 and the various switches of the network 105 may be in accordance with the well-known X.25 packet switching standard. A data base technique for routing 800 and other special service calls through a network to a termination point useful in the present invention is that described and claimed in U.S. Pat. No. 5,095,505, which is of common assignee with the present invention. The disclosure of that patent is incorporated herein by this reference.

Controlling the traffic load on the various ACDs and agent groups is somewhat akin to a linear programing transportation problem in that there will, at any given time, be a level of "demand" for service (indicated by the rate of incoming calls to a particular number), a level of "supply" available at various locations for responding to the demand (i.e., the availability of an ACD/agent service group), and a "cost" factor which bears upon whether certain traffic is routed to one ACD or another (e.g., the cost of routing calls originating in, say, Atlanta to an ACD in San Francisco as opposed to routing the same traffic to New York).

In accordance with the invention, information from various sources for determining the supply and demand is provided to a data collector 121. The data collector 121, which may be a VAX computer as available from Digital Equipment Corporation, is provided with inputs from, among other things, each ACD for each customer (as from ACDs 117–119) and, indirectly, from each originating and terminating switch (e.g., switch 107 and switches 113–115). The switch data is not, as a rule, provided directly by the switches, but rather it is obtained from the data base 111 since, in routing the calls, the data base 111 will be informed of the demand on the originating switches and on the terminating switches.

Thus, connected to the data base 111 is a traffic statistics gathering system 112 which collects the switch data from the data base 111 and provides summarized switch statistics, both for originating and terminating switches. Information is gathered on traffic sent from each originating switch to each terminating switch. This provides data on current caller demand (originating switch data) as well as historical perspective on how that demand has been satisfied (terminating call statistics). The traffic statistics system 112 may also be a VAX computer interconnected to the data base 111 by an ethernet connection which is shown in FIG. 1 as connection 108. The information provided to the data collector 121 directly from the ACDs may be effectively provided via packet switching connections in accordance with the well-known X.25 standard.

The switch statistical data, delineating call attempts and call completions for an 800 number, is preferably provided on some short periodic cycle, typically not to exceed about every five minutes. In providing the data, the switches are each also associated with a particular Number Plan area (NPA, or Area Code) so that the originating switch data is organized and presented by the data collector 121 in terms of "demand" originating from each NPA.

In contrast to the switch and traffic statistical data which is indicative of demand, each ACD provides the data collector 121 with data indicative of the ACD's supply capabilities. This includes (a) the average call talk time; (b) the average call work time per agent; (c) the number of calls in queue; and (d) the number of available agents. The average call time is the average amount of agent time spent in call talk and call work for all calls completed in a time interval. To handle the random nature of the data, statistical filters are used to "smooth" the data. For example, data may be collected every five minutes and then "weighted" against the last three intervals.

The average work time is simply the average time spent by an agent following call completion (i.e., time not spent on-line with a call). The number of calls in queue is a measure of current call backup, if any. The number of agents is the number that are either currently processing incoming calls or are available to do so.

Since the various ACDs may be of diverse manufacture for a variety of subscribers, the supply data collected from them may inherently be in different formats and it may be presented in accordance with various protocols. It is preferable therefore to put the ACD supply data through a protocol converter so that it is presented to the data collector 121 in a uniform format and under the same protocol. Accordingly, a protocol converter 130 is included in the arrangement of FIG. 1 to accept the ACD data and to reformat that data as needed for uniform presentation to the data collector 121. The invention is therefore not limited to use with ACDs of a single manufacturer but has a more universal utility. As is well known, ACDs are themselves well adapted to provide the kind of data used for determining supply. For example, the data mentioned above on average call time, speed of answer, and number of calls in the queue is readily provided by ACDs of the type commercially available and widely used.

Processes for converting from one protocol to another are also well known in a number of contexts, and the protocol converter 130 is preferably implemented by the same computer or processor which provides the data gathering function of data collector 121. Alternatively, of course, the protocol converter 130 may be a stand-alone device. The exact implementation in any particular case is a matter of design choice for anyone of ordinary skill in the art.

The supply data from each ACD furnished to the protocol converter 130 and ultimately to the data collector 121 is by way of a data collection network which, in FIG. 1, includes data collection lines 131-133 between ACDs 117-119, respectively, and the protocol converter 130. This network, as with other data networks used in connection with the invention, may also be a packet network using the X.25 standard as mentioned above.

Because the supply of resources available to respond to the demand for services depends not just on ACD factors, but also on the availability of agent personnel, it is preferable that the supply data further include a scheduled measure of agent availability. Accordingly, a manpower planning system 135 provides inputs to the data collector 121 indicative of the number of agents scheduled to be available by ACD and by special service number (e.g., by 800 number within an ACD grouping). A suitable commercial device for the manpower planning system 135 is that manufactured and distributed as Model No. MPS by TCS, Inc. of Nashville, Tenn. Subscribers for special service calling may have access to the manpower planning system 135 for the purpose of updating the data therein regarding the supply of operator agents provided by them. There is, therefore, not only the current ACD information, but look-ahead data which can be incorporated to allow for manpower changes due to take place in the near term.

The manpower information is used to provide a more refined count of agent availability. Information on agents scheduled during some time period defines the level of departing and arriving agents. A difference, or "delta" is then calculated comparing the next period with the current period. The delta is then applied to the agent counts received from the ACDs. The result is a more accurate count of the number of agents that will be available when the route plan to be determined is put into effect.

The data gathered by the data collector 121, representing the demand for call services by geographic distribution (e.g., Area Code) and the supply of resources available at various ACDs to respond to the demand, is presented by the data collector 121 to a data analysis unit 140. Preferably, the supply and demand data will be representative of real-time conditions (i.e., reflective of immediately prevailing conditions) or will be on such a short cycle time that the data is at least near real-time. As will be more fully detailed hereinbelow, the data analysis unit 140 performs a load balancing analysis and produces an optimized routing plan for a particular network of ACDs. The analysis and computations are based on the currently available measures of supply and demand as provided by the data collector 121, and on the relative costs of routing the traffic to one ACD or another and of providing service at one or the other. The relative cost data used in the analysis need not be highly dynamic and may be determined off-line and loaded into the analysis unit 140 periodically as required to comply with changing conditions.

The relative cost data may obviously vary from subscriber to subscriber, but generally will be reflective of the relative costs of providing service by one ACD and agent group as opposed to some other ACD and agent group.

The data analysis unit 140 is effectively implemented by using a VAX computer (available from Digital Equipment Corporation), suitably programmed to determine an optimized routing plan as will be set forth in detail hereinbelow.

The routing plan produced by the analysis unit 140 is provided to a presentation system 142 which is adapted to visually display the plan, preferably in the form of a matrix showing the level of traffic to be routed to each ACD from various geographic areas. The presentation system 142 may be configured from an IBM PS/2 computer with presentation manager windowing capabilities. This allows the user to view multiple sets of information simultaneously. For example, although the analysis unit 140 provides newly formulated routing plans, the presentation system 142 also retains and presents the routing plan currently in effect as well as other information and data pertaining to the flow of traffic. The presentation system 142 also accepts supply and demand data from the data collector 121, via the analysis unit 140. With this data the presentation system 142 also operates for various monitoring purposes (as opposed to direct, automatic control). For example, the presentation system 142 can use the demand information for a network of ACDs to produce a display of that data in the form of a histogram showing call attempts by geographical region. Alternatively, as another example, the data may be used to create and display a histogram showing the utilization of a particular ACD as a percentage of its capacity for handling calls. The presentation system 142 is also operative for setting alarms with respect to the collected data so that operating personnel can be alerted as certain boundary conditions are approached or exceeded. An example of this is the provision of an alarm to indicate that a particular ACD is approaching a traffic overload condition.

Although the routing plan produced by the analysis unit 140 is displayed by the presentation system 142, and although the presentation system may be adapted to permit inputs from operating personnel to manually alter that plan to some extent, for automatic control, the routing plan is passed through the presentation system 142 to a network management control system 144. The network management control system 144 has management control over the routing data base 111 and can effect changes in the routing information stored therein. Thus as routing plans produced by the data analysis unit 140 are received by the network control system 144 any changes to be made are loaded into the data base 111 to replace the routing information presently being used. The originating switches, such as switch 107, are consequently directed by the new routing data until such time as a new plan is implemented.

For most switched telephone networks the network management control system 144 will be pre-existing and will be adapted to facilitate changes to the routing information stored in the data base 111. The data base 111 and the network control unit 144 may each also be implemented with DEC VAX computers.

Overall, the system functions somewhat as a flow controller, directing traffic to the various ACDs to maximize distribution efficiency.

For determining the routing plan (by the data analysis unit 140), a measure of demand is required. A single interval of data may be inadequate due to the random nature of the call volume. Therefore "data smoothing" techniques along with a "trend" function are preferably applied to the data. The result, in any case, is a value indicative of not only the current traffic state but also time-of-day traffic patterns of the call volume originated from each geographical area for each 800 number.

On the supply side, the factors mentioned above are used to calculate a "capacity" measure for each ACD. The following formula is useful:

$$\text{Capacity} = \frac{\text{Number of Agents}}{ACT + AWT} - \text{Number of Calls in Queue}$$

where
ACT = Average Call Time
AWT = Average Work Time
The AWT and Calls in Queue factors result in reducing the capacity for new traffic by the ACD. Thus, some of the actual capacity must be used to satisfy the calls already awaiting answer.

Given the total demand (i.e., calls from given areas) and the total capacity (calls that can be handled at an ACD), a "midpoint utilization factor" is also determined on the presumption that the system is exactly balanced. The midpoint utilization factor may be calculated from:

$$\text{Midpoint Utilization} = \frac{\text{Total Demand [all areas]}}{\text{Total Capacity [all } ACDs \text{ for an 800 \#]}}$$

The midpoint utilization factor is used to determine a supply level for each ACD by the following:

*Supply Midpoint Capacity = Capacity * Midpoint Utilization * (1 + Relaxation Factor)*

In this formula, the relaxation factor is an arbitrary entry which is used to artificially increase the capacity of an ACD by some amount. This is a desirable feature since in some instances there may be a preferred, or "home", ACD which a subscriber would prefer to receive a particularly increased proportion of the traffic. A non-zero relaxation factor, if used, will cause a certain amount of traffic to be biased to the factored ACD.

Using quantities obtained from these formulas and other relative, empirical factors of cost in routing to one ACD or another as parameters of a linear programming transportation problem (total "demand" must equal total "supply"; i.e., switch originations equal midpoint capacities) an initially feasible, but nevertheless near optimal solution is determined. The solution can be reached by using an optimizing algorithm such as Vogel's Approximation Method (VAM) which is a well known linear programming initial estimation method.

Designating C(ij) as the relative cost of routing calls X(ij) from area (i) to ACD (j), and treating the matter as a transportation problem, it is sought to minimize the general expression:

$$C(11)X(11) + C(12)X(12) + \ldots + C(ij)X(ij)$$

subject to the source constraints of:

$$X(11) + X(12) + \ldots + X(1j) = \text{Sum of Calls from Area 1 to } j \text{ ACDs}$$

$$\vdots$$

$$X(i1) + X(i2) + \ldots + X(ij) = \text{Sum of Calls from Area } i \text{ to } j \text{ ACDs}$$

and subject to the capacity constraints of:

$$X(11) + X(21) + \ldots + X(i1) = \text{Midpoint Capacity of } ACD\ 1$$

$$\vdots$$

$$X(1j) + X(2j) + \ldots + X(ij) = \text{Midpoint Capacity of } ACD\ j$$

Most effectively, and again treating the allocation as a transportation problem, a matrix can be formed (based on the three factors of supply, demand, and cost) to provide a balanced routing plan. The network's "midpoint" is the load balancing goal. This utilization is most effectively illustrated by an example.

Considering a network comprising, for example, seven originating areas (e.g., area codes) with each having, at any time, a certain calling level of demand. On the supply side, there will exist a certain number of call distributors (say, six), each having a certain capacity as may be determined from the factors mentioned above. This can be set forth as follows.

| Demand: | | | | | | | |
|---|---|---|---|---|---|---|---|
| Area | 1 | 2 | 3 | 4 | 5 | 6 | 7 |
| Origination | 60 | 50 | 30 | 60 | 40 | 80 | 90 = 410 |
| Capacity: | | | | | | | |
| ACD | 1 | 2 | 3 | 4 | 5 | 6 | |
| Capacity | 90 | 300 | 30 | 50 | 50 | 100 = 620 | |
| Midpoint Capacity: | | | | | | | |
| ACD | 1 | 2 | 3 | 4 | 5 | 6 | |
| Midpoint | 59 | 199 | 20 | 33 | 33 | 66 = 410 | |

The midpoint capacity is determined in each case by multiplying the total capacity at each ACD by the ratio of the total originations to the total capacity (i.e., in this case 410/620 = 0.66). Thus, the total demand (i.e., switch originations) is equal to the total supply (i.e., midpoint capacities) to deal with a balanced transportation problem.

The following matrix, based on this example, further illustrates the methodology.

| | | ACD | | | | | | |
|---|---|---|---|---|---|---|---|---|
| | | 1 | 2 | 3 | 4 | 5 | 6 | Demand |
| Area | 1 | 1 | M | 2 | M | 3 | 4 | 60 |
| | 2 | M | 1 | M | 2 | 2 | 4 | 50 |
| | 3 | M | 1 | 1 | 2 | M | 5 | 30 |
| | 4 | 5 | 1 | M | 2 | 1 | 3 | 60 |
| | 5 | M | 1 | 1 | M | 1 | 2 | 40 |
| | 6 | 1 | 1 | M | M | M | 2 | 80 |
| | 7 | 5 | 4 | 3 | 2 | 1 | M | 90 |
| | Supply | 59 | 199 | 20 | 33 | 33 | 66 | |

The demand is specified in the right hand column (vertical) for the seven areas of origination, and supply is specified in the bottom row (horizontal) for the six ACDs. The numbers 1 through 5 and M, as entries to the cells of the matrix, represent relative cost factors for routing from a particular area to a particular ACD, as reflected by a row-column intersection. The higher the number, the higher the cost factor. The letter M is entered to represent a prohibitively high cost factor to prevent certain route paths.

In the matrix, for example, Area 1 shows a demand of 60 and ACD 1 shows a midpoint supply capacity of 59. The intersection of the row and column for these levels of supply and demand further shows a relative cost factor of 1 (i.e., for routing calls, $Xij = X11$, from area 1 to ACD 1).

Using the matrix, routing allocations are made to distribute the level of demand across the level of supply based on the following VAM steps:

1. For each row and column, the difference between the lowest and the next-to-lowest cost factor for that row and column is determined. In the row or column with the largest cost factor difference the cell with the lowest cost factor is selected. Where differences are the same (i.e., where there are "ties"), an arbitrary selection is made. The rationale for the selection is that if this cell is not selected, any remaining supply or demand in this column or row has to be shipped using a second minimum cost cell or even a higher cost cell. This would negatively impact the objective of minimizing cost.

2. For the selected cell, either the supply or the demand for that row or column is allocated, whichever is less. The supply or demand number, whichever is selected, is thus taken as $Xij$, the number of calls of the demand from a particular area to a particular ACD. The supply or demand, whichever is selected, is thus allocated as part of the route plan and is removed from consideration in subsequent allocations to build the entire plan.

In this step the following cases may occur.

Case 1—If demand is less than supply, make all cells in the given row inadmissible for all subsequent processing; modify supply for the intersecting column so that it equals supply minus demand; return to Step 1.

Case 2—If demand is greater than supply, make all the cells in the respective column inadmissible for all subsequent processing; modify demand for the intersecting row so that it equals demand minus supply; return to Step 1.

Case 3—If supply equals demand, and if at this stage of the processing there is only one admissible cell left, then terminate as the routing plan can then be completed.

Basically, the supply or demand allocated by this Step 2 is removed (row or column) from the matrix, and Steps 1 and 2 are repeated until total supply equals total demand.

The following example, using the foregoing matrix and network hypotheticals, helps to further illustrate and explain the foregoing steps.

In the first pass the following results are obtained:

| ACDs | 1 | 2 | 3 | 4 | 5 | 6 | Demand | Row Difference |
|---|---|---|---|---|---|---|---|---|
| 1 | 1 | M | 2 | M | 3 | 4 | 60 | 2 − 1 = 1 |
| 2 | M | 1 | M | 2 | 2 | 4 | 50 | 2 − 1 = 1 |
| 3 | M | 1 | 1 | 2 | M | 5 | 30 | 1 − 1 = 0 |
| 4 | 5 | 1 | M | 2 | 1 | 3 | 60 | 1 − 1 = 0 |
| 5 | M | 1 | 1 | M | 1 | 2 | 40 | 1 − 1 = 0 |
| 6 | 1 | 1 | M | M | M | 2 | 80 | 1 − 1 = 0 |
| 7 | 5 | 4 | 3 | 2 | 1 | M | 90 | 2 − 1 = 1 |
| Supply | 59 | 199 | 20 | 33 | 33 | 66 | | |
| Column diff. | 1-1 | 1-1 | 1-1 | 2-2 | 1-1 | 2-2 | | Select $X11 = 59$ |
| | 0 | 0 | 0 | 0 | 0 | 0 | | Eliminate column 1 |

Thus, in a first allocation, 59 calls of the total demand of 60 from area one are allotted to ACD 1 ($X11 = 59$), thereby removing the capacity of ACD 1 from further consideration.

In the second pass the following results are obtained:

| ACDs | 2 | 3 | 4 | 5 | 6 | Demand | Row Difference |
|---|---|---|---|---|---|---|---|
| 1 | M | 2 | M | 3 | 4 | 1 | 3 − 2 = 1 |
| 2 | 1 | M | 2 | 2 | 4 | 50 | 2 − 1 = 1 |
| 3 | 1 | 1 | 2 | M | 5 | 30 | 1 − 1 = 0 |
| 4 | 1 | M | 2 | 1 | 3 | 60 | 1 − 1 = 0 |
| 5 | 1 | 1 | M | 1 | 2 | 40 | 1 − 1 = 0 |
| 6 | 1 | M | M | M | 2 | 80 | 2 − 1 = 1 |
| 7 | 4 | 3 | 2 | 1 | M | 90 | 2 − 1 = 1 |
| Supply | 199 | 20 | 33 | 33 | 66 | | |
| Column | 1-1 | 1-1 | 2-2 | 1-1 | 2-2 | | Select $X13 = 1$ |
| diff. | 0 | 0 | 0 | 0 | 0 | | Eliminate Row 1 | in this allocation, the remaining demand (= 1) is allocated to ACD 3 ($X13 = 1$), thereby satisfying the remaining demand of one call from Area 1.

In a third pass, the following are the results:

| ACDs | 2 | 3 | 4 | 5 | 6 | Demand | Row Difference |
|---|---|---|---|---|---|---|---|
| 2 | 1 | M | 2 | 2 | 4 | 50 | 2 − 1 = 1 |
| 3 | 1 | 1 | 2 | M | 5 | 30 | 1 − 1 = 0 |
| 4 | 1 | M | 2 | 1 | 3 | 60 | 1 − 1 = 0 |
| 5 | 1 | 1 | M | 1 | 2 | 40 | 1 − 1 = 0 |
| 6 | 1 | M | M | M | 2 | 80 | 2 − 1 = 1 |
| 7 | 4 | 3 | 2 | 1 | M | 90 | 2 − 1 = 1 |
| Supply | 199 | 19 | 33 | 33 | 66 | | |
| Column | 1-1 | 1-1 | 2-2 | 1-1 | 2-2 | | Select $X22 = 50$ |
| diff. | 0 | 0 | 0 | 0 | 0 | | Eliminate Row 2 |

In this stage, the total demand of 50 from Area 2 has been allocated to ACD 2 ($X22 = 50$).

This process continues in the same manner through subsequent passes as necessary until the following final matrix is reached wherein there is but one row remaining.

| ACDs | 2 | 3 | 4 | Demand |
|---|---|---|---|---|
| | 7 | 4 | 3 | 2 | 57 |
| Supply | | 5 | 19 | 33 | |
| Select X72 = 5 | | | | | |
| X73 = 19 | | | | | |
| X74 = 33 | | | | | |

By this process it is determined that X11=59, X13=1, X22=50, X62=80, X75=33, X42=60, X56=40, X36=26, X32=4, X72=5, X73=19, and X74=33. This is enough to fully define a recommended, balanced route plan.

If RP(ij) is the portion of calls routed from Area (i) to ACD (j) then $$RP(ij) = X(ij)/\text{Total calls from area } i.$$

In this example, the following total route plan results:

| | |
|---|---|
| Area 1 RP11 = 59/60 = 99% | Area 5 RP56 = 40/40 = 100% |
| RP13 = 1/60 = 1% | Area 6 RP62 = 80/80 = 100% |
| Area 2 RP22 = 50/50 = 100% | Area 7 RP72 = 5/90 = 6% |
| Area 3 RP32 = 4/30 = 13% | RP73 = 19/90 = 20% |
| RP36 = 20/30 = 87% | RP74 = 33/90 = 37% |
| Area 4 RP42 = 60/60 = 100% | RP75 = 33/90 = 37% |

From this it will be observed, for example, that 99% of the traffic from Area 1 is routed to call distributor 1 and that the remaining 1% is routed to call distributor 3. Calling traffic from other areas is routed as noted.

A process for arriving at a route plan in accordance with the foregoing is carried out in the analysis unit 140, the programming of which is considered to be within the range of ordinary skills for computer programmers, given the foregoing explanation and examples. The network control unit 144 accepts the route plan generated by the analysis unit 140 and is operative to change the routing control information in data base 111 so that traffic is apportioned in accordance with the plan. The plan is preferably updated frequently on at least a near real-time basis.

The flow charts of FIGS. 2A-2D depict the overall operative steps of the invention. It may be observed that the operation depicted is cyclical, and the process repeats on some periodic basis (e.g., every five minutes). Initially, at step 201, traffic statistics are gathered which are indicative of the demand on the network's originating and terminating switches (e.g., switches 107 and 113-115 of FIG. 1). Although that data may be obtained directly from the switches, it will be recalled that, conveniently, it can be derived indirectly from the data base that is queried for the call routing directions (e.g., the data base 111). Thereafter (although the order is not critical), in step 203 data is retrieved from the various ACDs and that data, as by a protocol converter, is put into a standard format. Steps 201 and 203 are preferably carried out in the protocol converter 130 and/or the data collector 121.

Next, in step 205, the data collected to this point is preferably validated. This is a step to confirm that the calls reported by the various ACDs are in agreement with the calls determined to have been handled by the terminating switches. Discrepancies are specifically checked for in step 207, which, along with step 205, is carried out in the data analyzer 140. If there is a discrepancy, step 209 is performed whereby the discrepancy and the details pertaining thereto are made known to operating personnel as by the presentation system 142 of FIG. 1. An alarm, which may, of course, be either audible and/or visual can be provided.

Normally there will be no discrepancy and the process steps shown as steps 211-217 will be carried out by the data analyzer 140 (including operations as specifically discussed hereinabove for determining a routing plan). That is, in step 211 the statistics are analyzed and "rolled up." This essentially partitions the data in a more meaningful form for presentation to operating personnel. For example, the analysis may be operative to combine caller data received by area code and partition or combine that data for some other calling area (such as, for further example, to present number of calls from a particular state).

Is step 212 the data is formatted as desired for presentation to operating personnel. Also included is step 213 whereby the process checks to determine if certain load balancing thresholds are exceeded (i.e., to determine if the traffic being routed to a particular site is in excess of a desired level). If a threshold is exceeded then there is a step, 214, whereby the manpower planning data (as from system 135 of FIG. 1) is accessed for the latest availability data for use in determining a new routing plan. The available data from the current cycle of the process is then utilized in step 215 for the creation/calculation of an updated routing plan.

On the other hand, if, at step 213, there is no unbalanced load conditions (i.e., no thresholds exceeded) the process retains the current routing plan and there is a skip ahead from step 213 to step 216.

In step 216, whether entered with a new routing plan or as a skip-ahead, the alarm conditions are updated based on the current ACD and traffic statistics. In step 217 the alarms, statistics, and route plan (if generated) are sent to the presentation system. Step 219 is provided to cause a display of the results to the user.

In many cases it will be preferable to give operating personnel the opportunity to check the generated routing plan and to exercise "go-no-go" control over the plan. This is provided for at step 221. If the plan is acceptable, the updated plan is forwarded to the network control system 144 of FIG. 1 by operation of step 223. The routing data base 111 is then updated at step 225 with the latest generated routing information and, by step 227 the presentation system is notified and caused to display the current in-effect plan. Finally, In the event the plan is not accepted at step 221, or once a new plan is entered via step 223,225 and 227, there is an exit and hold at step 230 until a new set of statistics are received and the start of a new cycle.

The foregoing describes certain embodiments of the invention and describes the invention in terms of the best mode thereof. It will be recognized by those of ordinary skill in the art that various other modifications may be made therein without departure from the inventive concepts inherent in the invention. Accordingly, it is intended by the following claims to claim all modifications which fall within the true spirit and scope of the invention.

The invention claimed is:

1. A system for dynamically balancing traffic in the form of special service telephone calls among a plurality of automatic call distributors (ACDs) as a function of a level of demand for such special service calls and a level of supply available to respond to said demand, said ACDs being connected to receive said special service calls via a telephone network having originating and terminating switches for network routing of the calls at various costs and a routing data base accessible by the originating switches to obtain switch routing directions for said special service calls therefrom, comprising:
  (a) a data gathering means connected to gather data indicative of said demand from said switches and indicative of said supply from each ACD and operative to formulate information from said gathered data which statistically characterizes the supply and demand for said special service calls;
  (b) an analysis means for receiving information indicative of said costs and for receiving said information which characterizes said supply and demand from said data gathering means and operative to process said information indicative of costs and said information characteristic of said supply and demand to formulate a plan for routing said special service calls from said originating switches to said ACDs so that the number of calls to each ACD is allotted as a function of the level of demand for service, the level of supply of service, and the cost of routing; and
  (c) a control means interconnected to receive said routing plan from said analysis means and operative to automatically effect changes in the data base so that the originating switches are directed in a manner to implement said routing plan.

2. The system of claim 1 further including a manpower planning means for providing the data gathering means with data representative of manpower available for responding to any portion of said special service calls which may be routed to each ACD, said data being for use in further characterizing said supply for said special service calls.

3. The system of claim 2 wherein said data gathering means is further connected to gather data indirectly from said originating and terminating switches via said data base.

4. The system of claim 2 further including a presentation means for visual display of said routing plan.

5. A method for automatically balancing special service telephone calling traffic among a plurality of call distributors and among service groups of operators assigned to said call distributors, said traffic being in the form of telephone calls originating from various geographic areas, such method comprising the steps of:
  (a) determining a level of demand for special telephone calling services for each of said various geographic areas;
  (b) determining a level of supply of services available for response to said telephone calls for each call distributor and each service group;
  (c) establishing a cost factor indicative of the relative cost of routing calls from each of said various geographic areas to each of said call distributors and operator service groups;
  (d) allocating the level of demand for the various geographic areas across the level of supply for each call distributor such that the relationship $$C(11)X(11)+C(12)X(12)+\ldots+C(ij)X(ij)$$

is automatically minimized subject to the demand constraints of $$X(11) + X(12) + \ldots + X(1j) = \text{a level of demand from a first one of said geographical areas}$$
$$X(i1) + X(i2) + \ldots + X(ij) = \text{a level of demand from a last one of said geographical areas}$$

and to subject to the supply constraints of $$X(11) + X(21) + \ldots + X(i1) = \text{a level of supply available at a first one of said call distributors}$$
$$X(1j) + X(2j) + \ldots + X(ij) = \text{a level of supply available at a last one of said call distributors}$$

and wherein $X(ij)$ represents a level of demand or of supply, as appropriate, from an ith area to a jth call distributor and $C(ij)$ represents the cost factors determined in step (c).

6. A method for balancing traffic in special service telephone calls among automatic call distributors (ACDs) connected to receive the traffic from switches routing the traffic through a network having access to a data base for providing information determinative of said routing, comprising the steps of:
  (a) gathering demand data from at least some of said switches, said demand data being indicative of a level of demand for the special service telephone calls;
  (b) gathering supply data from said ACDs, said supply data being indicative of a level of supply available from each ACD to respond to said demand;
  (c) providing cost data indicative of the relative costs of routing the traffic through the network to various ones of said ACDs;
  (d) analyzing the data obtained from steps (a), (b), and (c) to formulate a plan for routing the traffic through said network to said ACDs as a function of the level of demand for the special service telephone calls, the level of supply available, and the relative costs of routing to the various ones of said ACDs; and
  (e) effecting changes in the data base to cause implementation of the formulated plan within the network.

7. The method of claim 6 wherein steps (a) through (e) are repeated periodically.

8. The method of claim 7 wherein the demand data is gathered to provide an indication of demand for the special service telephone calls from various geographic areas.

9. The method of claim 8 wherein the supply data for each ACD may be arbitrarily increased to cause said routing plan to direct an increased amount of the traffic to an ACD for which the supply data is so increased.

10. The method of claim 7 wherein the supply data includes a measure of scheduled service groups of operators assigned to each ACDs for responding to the special service telephone calls.

11. The method of claim 7 wherein the plan formulated in step (d) is presented to operating personnel for the network prior to performance of step (e) and said operating personnel may cause the plan to be altered prior to performance of step (e).

12. A method for automatically balancing special service telephone calling traffic among a plurality of call distributors and among service groups of operators assigned to said call distributors, said traffic being in the form of telephone calls originating from various geographic areas and routed therefrom through a network to said call distributors, comprising the steps of:
- (a) determining a level of demand for special telephone calling services for each of said various geographic areas;
- (b) determining a level of supply of services available for response to said telephone calls for each call distributor and each service group;
- (c) establishing a cost factor indicative of the relative cost of routing calls from each of said various geographic areas to each of said call distributors and operator service groups;
- (d) allocating the level of demand for the various geographic areas across the level of supply for each call distributor, taking into account the cost factors determined in step (c), to produce a plan for routing said calls from the various areas through the network such that the calls are apportioned to each call distributor and operator service group with minimized costs and a balance of the level of supply with the level of demand; and
- (e) implementing the routing plan within the network.

13. The method of claim 12 wherein steps (a) through (e) are automatically repeated periodically.

14. The method of claim 12 wherein prior to step (e) the plan is made available for review by operating personnel and the plan may be thereby manually altered.

15. The method of claim 12 wherein steps (a) through (d) are automatically repeated periodically and wherein prior to step (e) the plan is made available for review by operating personnel and the plan may be altered thereby.

16. The method of claim 13 wherein the level of demand in step (a) is determined from originating switches within the network.

17. The method of claim 16 wherein implementation of the routing plan in step (e) is caused by making changes to a data base whose contents determine routing of the calls originating from said areas.

* * * * *